(12) United States Patent
Stewart (10) Patent No.: US 11,684,218 B1
(45) Date of Patent: Jun. 27, 2023

(54) MULTIFUNCTIONAL COOKING DEVICE

(71) Applicant: Jessica Stewart, Largo, FL (US)

(72) Inventor: Jessica Stewart, Largo, FL (US)

( * ) Notice: Subject to any disclaimer, the term of this patent is extended or adjusted under 35 U.S.C. 154(b) by 0 days.

(21) Appl. No.: 18/147,154

(22) Filed: Dec. 28, 2022

(51) Int. Cl.
*A47J 43/28* (2006.01)

(52) U.S. Cl.
CPC .................................. *A47J 43/288* (2013.01)

(58) Field of Classification Search
CPC ........ A47J 43/288; A47J 43/28; A47J 43/281; A47J 43/287
USPC ......... 30/142, 147, 148, 149, 324, 325, 327, 30/328
See application file for complete search history.

(56) References Cited

U.S. PATENT DOCUMENTS

| | | | |
|---|---|---|---|
| 8,689,453 B2 * | 4/2014 | Vogan | A47J 43/281 30/142 |
| 10,076,213 B1 * | 9/2018 | Hon | A47J 43/285 |
| 2006/0272162 A1 * | 12/2006 | Atwater | B26B 3/04 30/303 |
| 2018/0014692 A1 * | 1/2018 | Millikin | A47J 37/1271 |

* cited by examiner

*Primary Examiner* — Phong H Nguyen
(74) *Attorney, Agent, or Firm* — Tiffany C. Miller; Inventions International Inc.

(57) ABSTRACT

A multifunctional cooking device is configured for chopping and stirring ground meat, about a radiused and/or convex surface, inside of a cooking pan. The multifunctional cooking device has a shaft with a handle located opposite a neck portion. A bowl is connected to the neck portion of the shaft. The bowl has a concave portion located opposite a back convex portion. The bowl has a plurality of bores traversing the bowl. Each bore has at least one side wall surface extending from the back portion of the bowl. At least one side wall surface having a tapered edge forming a blade. Each bore of the bowl is configured to receive chopped food when a user exerts a force on the multifunctional cooking device when the food is being chopped in a cooking pan, whereby, the food traverses the bore of the bowl to facilitate the chopping process.

5 Claims, 7 Drawing Sheets

MULTIFUNCTIONAL COOKING DEVICE

BACKGROUND OF THE INVENTION

1. Field of the Invention

This invention relates, generally, to a multifunctional cooking device, and in particular, to a utensil configured for chopping and stirring ground meat inside of a cooking pan using a spoon having a convex surface with a plurality of blades extending therefrom.

2. Background Art

The process of chopping and stirring many foods, such as ground beef, are typically accomplished by aggressively chopping with an edge of a flimsy spatula or stabbing the meat repeatedly with a narrow, wooden spoon. These methods are time intensive and often require a constant chopping motion, as wooden spoons, for example have a small surface area that directly contacts the meat and the pan during the chopping process. Some users, such as individuals, cooks, chefs, parents, and/or any individual that is cooking food that needs to be chopped and broken apart in a pan, have experienced wrist and/or palm pain from the impact of the wooden spoon as it contacts the cooking surface during the chopping process. There is a need for a more user friendly and less painful process of using a kitchen cooking utensil that eliminates the need to constantly chop by orienting a kitchen utensil in an up-and-down motion while cooking ground meat in a pan. Thus, there is a need for a multifunctional cooking device configured to make the ground meat cooking process more efficient and less time consuming. Some kitchen gadget innovations discussed below have attempted to address simplifying the process of cooking ground meat in a pan.

Currently existing in today's market, a mashing and chopping device used for cooking ground meat has a plurality of blades located opposite a plate having a plurality of openings. This device is too messy, as food contacts both ends and does not simultaneously chop and pull apart the ground meat during the cooking process. Further, although this cooking utensil is multifunctional, it does not have a spoon portion having the ability to scoop up meat. Another cooking utensil currently known for cooking ground meat is a spatula having a plurality of openings and an angular projection configured to capture and retain the meat in place while draining excess oils and/or fats from the retained meat. The elongated handle member of the spatula is planar to the chopping surface of the spatula, making it difficult for a user to apply pressure to the cooking utensil during cooking.

Another commercially available ground meat chopping device is known to have a handle located opposite a plurality of blades. A problem with this cooking utensil is that it is not multifunctional, as it does not have a spoon portion having the ability to scoop up cooked meat. Further, the straight up and down chopping motion required by this device for a user to perform during use, may result in a user becoming tired and/or may result in injury to a user and/or may damage the pan from the force of the device applied to the pan during the chopping process. Another kitchen utensil currently known for chopping and mashing food has a handle located opposite a plurality of projections. The plurality of projections are not tapered to form a blade. Further, this cooking utensil device does not have a spoon portion having the ability to scoop up meat. Therefore, there is a need for a multifunctional cooking device configured for more easily chopping and scooping of ground meat in a pan.

However, in view of the prior art considered as a whole at the time the present invention was made; it was not obvious to those of ordinary skill in the pertinent art how the identified needs could be fulfilled.

SUMMARY OF THE INVENTION

The long-standing but heretofore unfulfilled need for a multifunctional cooking device capable of chopping and stirring ground meat, about a radiused and/or convex surface, inside of a cooking pan and which also includes improvements that overcome the limitations of prior kitchen cooking utensils, is now met by a new, useful, and non-obvious invention. The multifunctional cooking device has a shaft. The shaft has a handle located opposite a neck portion. A bowl is connected to the neck portion of the shaft. The bowl has a concave portion located opposite a back portion. The back portion has a convex and/or radiused blade surface configured to contact food and/or a cooking surface during use. The bowl has at least one and/or a plurality of bores traversing the bowl. The bores may be any shape such as including, but not limited to, a square. However, it is an important aspect of this invention for the convex portion and/or radiused blades of the novel cooking device to be oriented in such a way as to facilitate a forward and/or backward, and/or side-to-side rolling motion across a cooking surface during use.

In a preferred embodiment, it is envisioned for this novel multifunctional cooking device to have at least one or a plurality of side wall surfaces forming a blade oriented perpendicular to the leading flange of the bowl and at least one or a plurality of side wall surfaces forming a blade oriented perpendicular to both the first support structure and the second support structure of the bowl. Each bore has at least one side wall surface extending from the back portion of the bowl. At least one side wall surface may have a tapered edge forming a blade. Each bore of the bowl is configured to receive chopped food when a user exerts a downward and forward and/or backward and/or side-to-side rolling force on the multifunctional cooking device to facilitate the chopping of food in a cooking pan. In particular, food traverses each of the bores of the bowl during the process of breaking apart the ground meat during the chopping process. Further, the concave surface of the bowl functions as a spoon. For example, despite having a plurality of bores traversing throughout the bowl portion, the concave surface of the bowl may be capable of scooping up and retaining a pile and/or a heap of clumped together food.

In some aspects, the techniques described herein relate to a multifunctional cooking device, including: a shaft, the shaft having a handle located opposite a neck portion; a bowl, the bowl is connected to the neck portion of the shaft, the bowl having a concave portion located opposite a back portion, the back portion having a convex surface; the bowl having a plurality of bores traversing the bowl, the plurality of bores each having a first opening located opposite a second opening, the first opening of the plurality of bores is located on the concave portion of the bowl, the second opening of the plurality of bores is located on the back portion of the bowl; the plurality of bores each having at least one side wall extending from the back portion of the bowl, the at least one side wall forming at least a portion of a chamber; and a flange, the flange extending from at least a portion of an outer perimeter edge of the bowl.

In some aspects, the techniques described herein relate to a multifunctional cooking device, further including: the neck portion of the shaft is connected to the bowl at an angle of inclination of at least 45°.

In some aspects, the techniques described herein relate to a multifunctional cooking device, further including: the flange is tapered, the flange is located on an opposite side of the bowl than a connection point of the neck portion of the shaft to the bowl.

In some aspects, the techniques described herein relate to a multifunctional cooking device, further including: an end of the at least one side wall having a tapered edge forming a blade.

In some aspects, the techniques described herein relate to a multifunctional cooking device, further including: the blade having a convex surface.

In some aspects, the techniques described herein relate to a multifunctional cooking device, further including: the at least one side wall borders at least a portion of the second opening of the back portion of the bowl.

In some aspects, the techniques described herein relate to a multifunctional cooking device, further including: an end of the at least one side wall having a serrated edge forming a blade.

In some aspects, the techniques described herein relate to a multifunctional cooking device, further including: the chamber is configured to receive chopped food when a user exerts a downward and forward and/or backward and/or side-to-side force on the multifunctional cooking device when food is being chopped in a cooking pan, whereby, the chopped food traverses at least one bore of the plurality of bores of the bowl.

In some aspects, the techniques described herein relate to a multifunctional cooking device, further including: the at least one side wall extending from the back portion of the bowl is oriented perpendicular to the flange.

In some aspects, the techniques described herein relate to a multifunctional spoon configured for chopping and stirring food, on a convex surface, inside a cooking pan, including: an elongated shaft, the shaft having a handle located opposite a neck portion; a bowl, the bowl is connected to the neck portion of the shaft, the bowl having a concave portion located opposite a blade having a radiused surface; and the bowl having a bore traversing the bowl, the bore of the bowl having a first opening located opposite a second opening, the first opening of the bore is located on the concave portion of the bowl, the second opening of the bore is located adjacent to the blade of the bowl.

In some aspects, the techniques described herein relate to a multifunctional spoon, further including: the neck portion of the shaft is connected to the bowl at an angle of inclination of at least 45°.

In some aspects, the techniques described herein relate to a multifunctional spoon, further including: a flange, the flange extending from at least a portion of an outer perimeter edge of the bowl.

In some aspects, the techniques described herein relate to a multifunctional spoon, further including: the flange is tapered.

In some aspects, the techniques described herein relate to a multifunctional spoon, further including: the bore of the bowl is configured to receive chopped food when a user exerts a downward and front and/or backward force on the multifunctional cooking device when the food is being chopped in a cooking pan, whereby, the food traverses the bore of the bowl.

In some aspects, the techniques described herein relate to a multifunctional cooking device, including: an elongated handle member having opposite proximal and distal ends; a non-planar support member being extended from the proximal end of the handle member, the support member having an outer perimeter edge formed from a first support structure located opposite a second support structure, the support member having a concave portion located opposite a back portion, the back portion having a convex surface; a flange, the flange extending from at least a portion of the outer perimeter edge of the support member; and at least one side wall extending from the back portion of the support member, the at least one side wall having a tapered edge forming a first blade, the first blade traversing a length from the proximal end of the handle member to the flange, the at least one side wall having a tapered edge forming a second blade, the second blade traversing the length from the first support structure to the second support structure.

In some aspects, the techniques described herein relate to a multifunctional cooking device, further including: the proximal end of the handle member is connected to the support member at an angle of inclination of at least 45°.

In some aspects, the techniques described herein relate to a multifunctional cooking device, further including: the flange is tapered.

In some aspects, the techniques described herein relate to a multifunctional cooking device, further including: the first blade is oriented substantially perpendicular to the flange.

In some aspects, the techniques described herein relate to a multifunctional cooking device, further including: the second blade is oriented substantially perpendicular to the first support structure and to the second support structure.

In some aspects, the techniques described herein relate to a multifunctional cooking device, further including: the distal end of the handle member having at least one opening.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustrating specific embodiments by which the invention may be practiced. It is to be understood that other embodiments may be utilized and structural changes may be made without departing from the scope of the invention.

Figure 1:
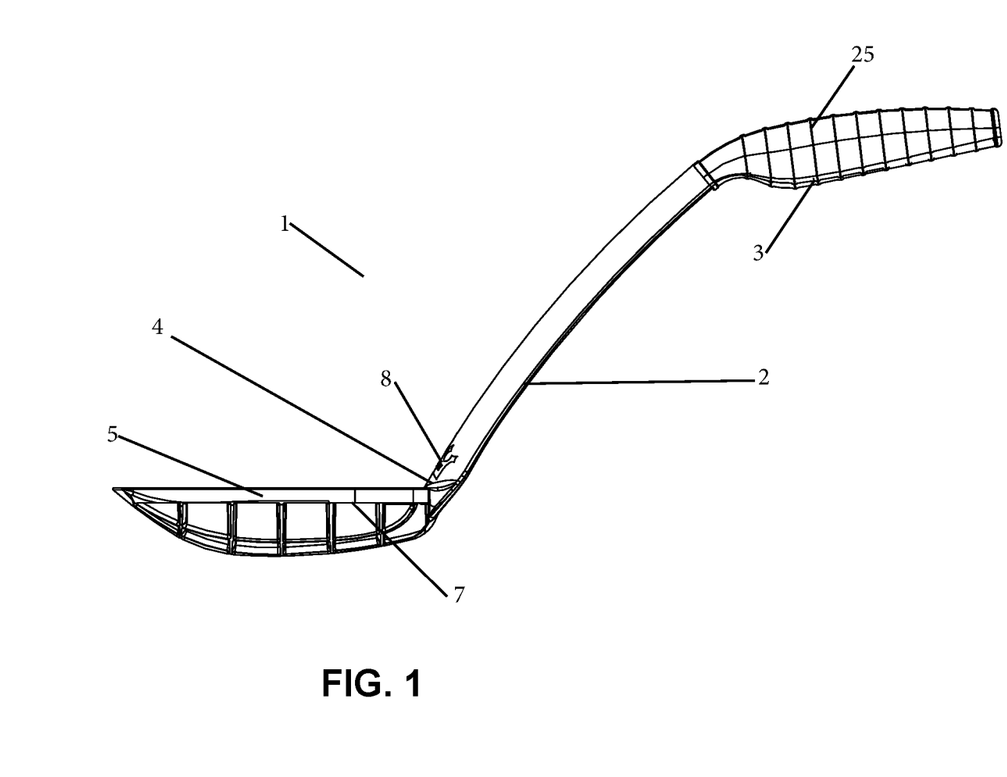
FIG. 1 is a left side elevation view of the novel multifunctional cooking device in accordance with an illustrative embodiment.
Figure 2:
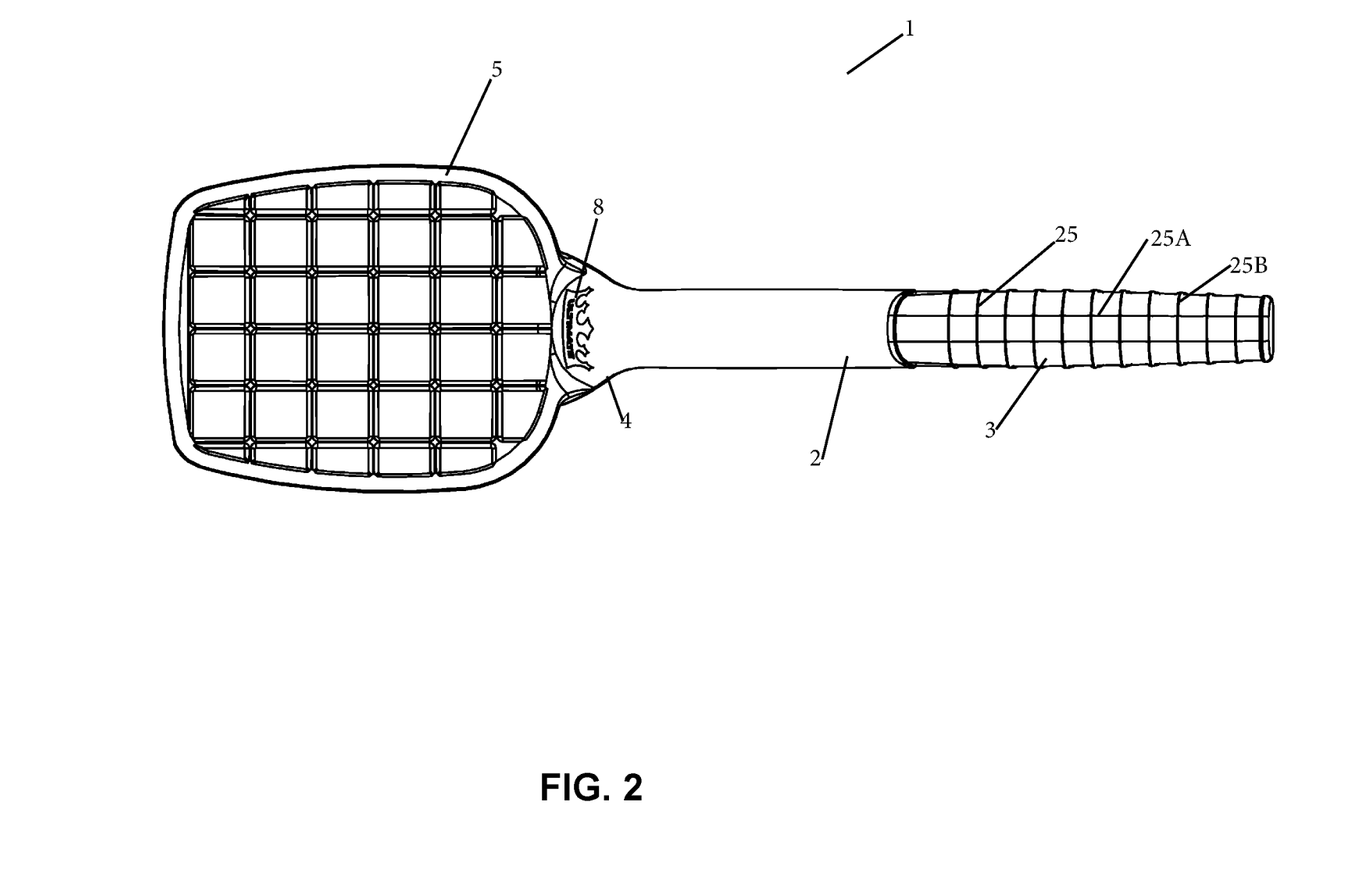
FIG. 2 is a top elevation view of the novel multifunctional cooking device in accordance with an illustrative embodiment.

In an embodiment, FIGS. 1 and 2 illustrate multifunctional cooking device 1 having shaft 2. Shaft 2 has handle 3 located opposite neck portion 4. Handle 3 of shaft 2 may have an opening (not shown) configured to receive a hook (not shown) to hang multifunctional cooking device 1 when not in use during storage. Bowl 5 is connected to neck portion 4 shaft 2. Handle 3 has plurality of ridges 25. It is within the scope of this invention for ridges 25 to be oriented in a crisscross pattern (FIGS. 1-2, and 6) in which horizontal ridges 25A (FIG. 2) overlay vertical ridges 25B (FIG. 2). In another embodiment, FIGS. 3-5 and 7 show ridges 25 wrapped around at least a portion of the sides of handle 3. A plurality of ridges 25 are oriented next to each other or parallel to each other with each ridge 25 having a space or non-ridge portion in between, whereby, the ends of a single length of a ridge do not touch as they wrap around the handle 3. Surface indicia 8 includes, but is not limited to, a logo that may be located on a surface of multifunctional cooking device 1.

Figure 3:
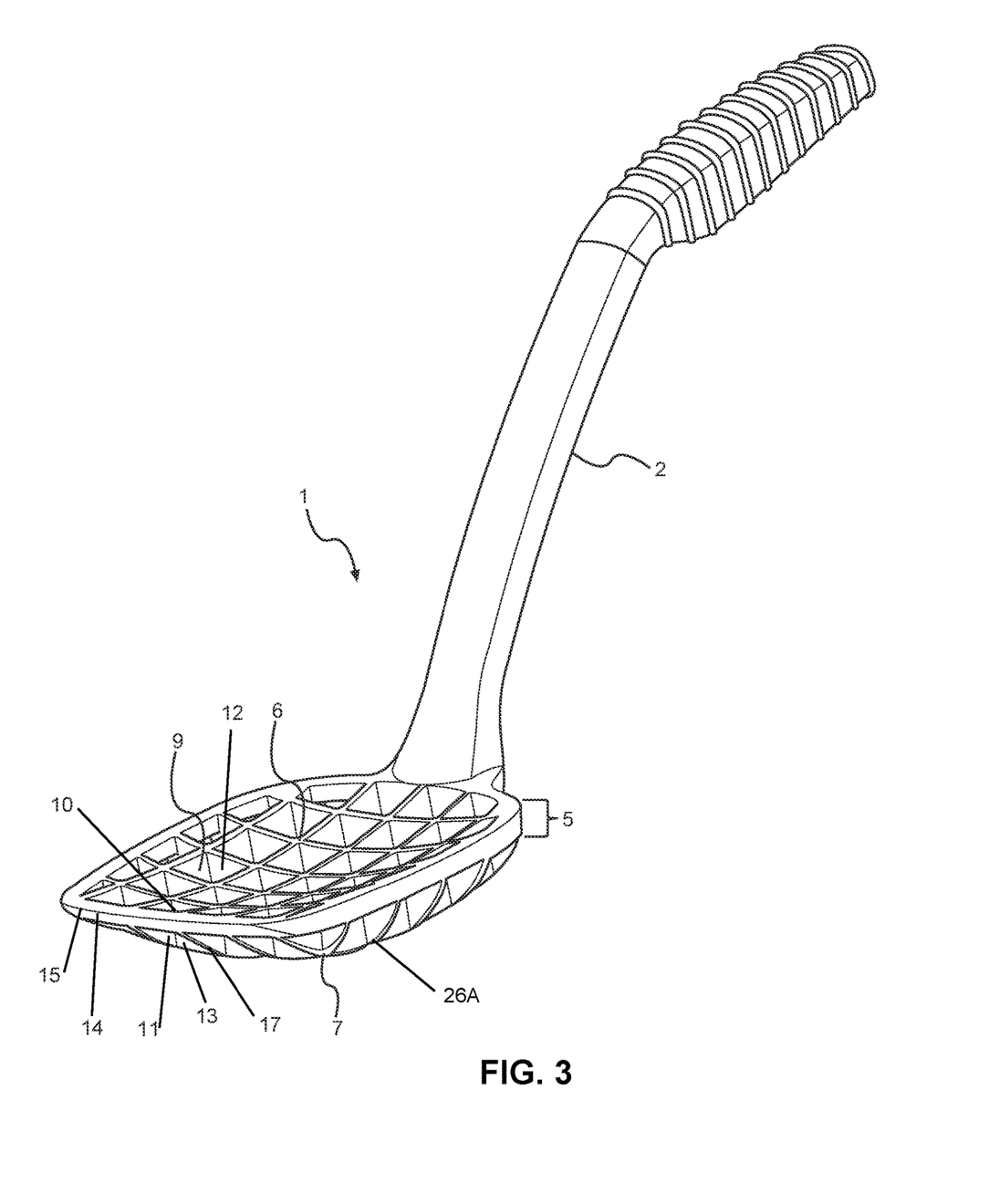
FIG. 3 is a side perspective view of the novel multifunctional cooking device in accordance with an illustrative embodiment.
Figure 4:
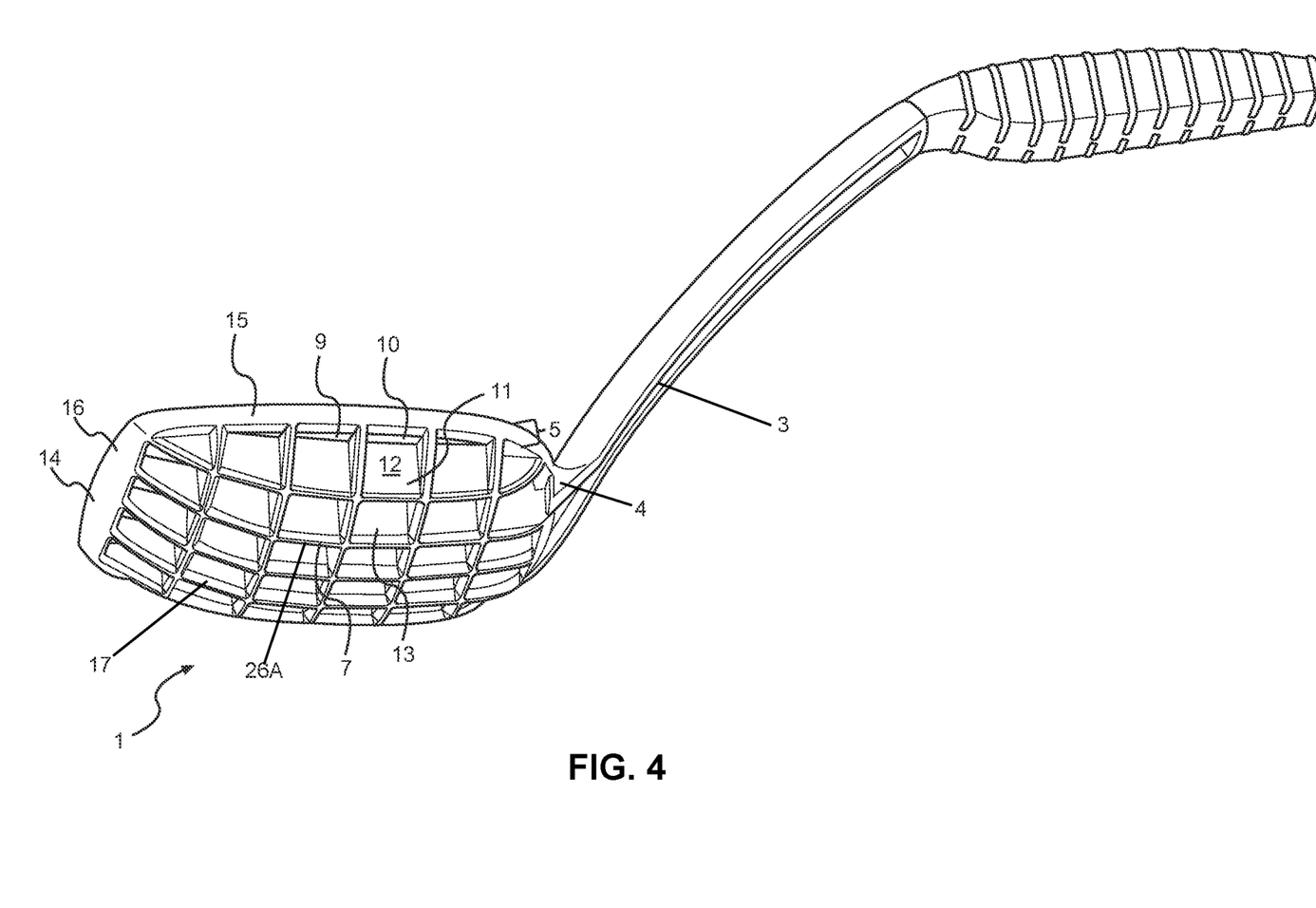
FIG. 4 is a bottom perspective view of the novel multifunctional cooking device in accordance with an illustrative embodiment.

Referring now to FIGS. 3 and 4, multifunctional cooking device 1 has bowl 5 having concave portion 6 (FIG. 3) located opposite back portion 7. Back portion 7 has at least one convex surface 26A. Bowl 5 has plurality of bores 9 traversing bowl 5. Plurality of bores 9 each have first opening 10 located opposite second opening 11. First opening 10 located on the top portion of each of plurality of bores 9 and being located on concave portion 6 (FIG. 3) of bowl 5. Second opening 11 of plurality of bores 9 is located on back portion 7 of bowl 5. Plurality of bores 9 each have at least one side wall surface 12 bordering bore 9 and extending from back portion 7 of bowl 5 to form tapered edge 17. Tapered edge 17 of side wall surface 12 is also referred to as a blade and/or a radiused blade. At least a portion of at least one blade is configured to contact a cooking surface (not shown) during use. At least one side wall surface 12 bordering at least one bore 9 forms at least a portion of chamber 13. Chamber 13 is configured to receive chopped food when a user (not shown) exerts a downward and forward and/or backward and/or side-to-side force on multifunctional cooking device 1 when food (not shown) is being chopped in a cooking pan (not shown). It is envisioned for chopped food (not shown) to traverse at least one bore 9 of the plurality of bores of bowl 5. Flange 14 extends from at least a portion of outer perimeter edge 15 of bowl 5. In an embodiment, flange 14 extends from an edge located opposite edge connected to neck portion 4 (FIG. 4) of handle 3 (FIG. 4).

Figure 5:
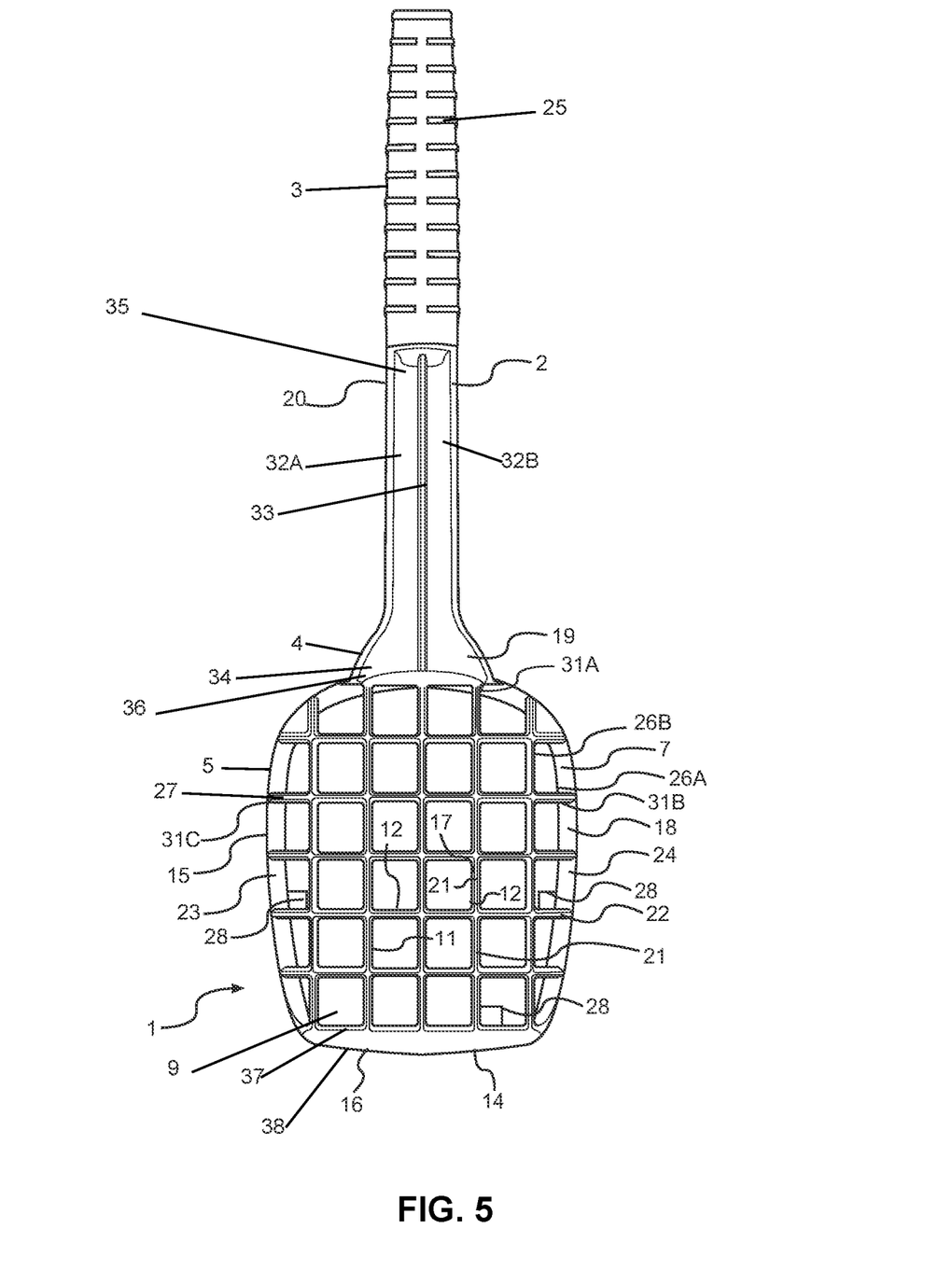
FIG. 5 is a bottom elevation view of the novel multifunctional cooking device in accordance with an illustrative embodiment.
Figure 6:
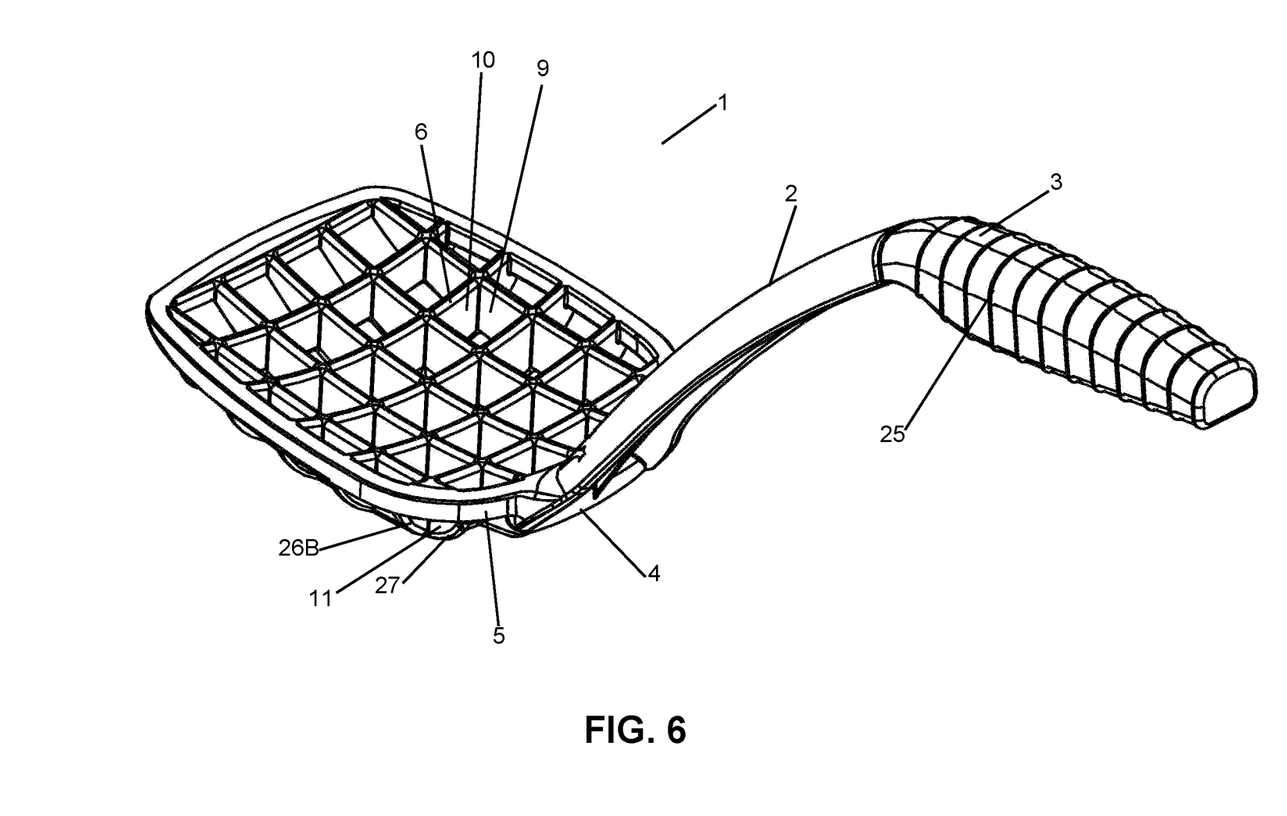
FIG. 6 is a top perspective view of the novel multifunctional cooking device chopping ground meat in a cooking pan in accordance with an illustrative embodiment.

FIG. 5 depicts multifunctional cooking device 1 having shaft 2 having first channel 32A and second channel 32B traversing at least a portion of the length of shaft 2 from handle 3 to neck portion 4. Support divider 33 separates first channel 32A from second channel 32B and traverses the length of shaft 2 from handle 3 to neck portion 4. First channel 32A and second channel 32B have an end having smaller perimeter 35 located opposite another end, being neck portion 4, having larger perimeter 36, whereby the neck portion is tapered 34. Channels 32A-32B allow cooking device 1 to be lightweight and support divider 33 allows cooking device 1 to be firm enough to prevent too much flexing during use. It is within the scope of this invention for leading flange 14 to be tapered 16, whereby, leading flange 14 is made of a thicker 37 amount of material closer to bore 9 and made of a thinner 38 amount of material further away from bore 9. A tapered leading flange 14 extending from bowl 5 facilitates a more efficient stirring process using multifunctional cooking device 1.

Referring again to FIG. 5, although a flange may extend from any portion of outer perimeter edge 15 of bowl 5, it is a preferred embodiment for leading flange 14 to be located on an opposite side of the connection point of neck portion 4 of shaft 2 to bowl 5. It is within the scope of this invention for at least one side wall 12 to have tapered edge 17 forming blade 27. At least one side wall 12 borders at least a portion of second opening 11 of bore 9. Tapered edge 17 of at least one side wall 12 forms blade 27. Blade 27 of at least one side wall 12 has convex surface 26B. At least one side wall 12 extends from convex surface 26A of back portion 7 of bowl 5. At least one side wall 12 extends from back portion 7 of bowl 5 and is oriented perpendicular to leading flange 14.

In an alternate embodiment, multifunctional cooking device 1 has an end of at least one side wall surface 12 having a serrated edge (not shown) forming a blade. At least one side wall surface 12, having a serrated edge forming a blade, borders at least a portion of second opening of the back portion of the bowl.

Referring again to FIGS. 5, 6, and 7 multifunctional cooking device 1 is also referred to as multifunctional spoon 1 and is configured for chopping and stirring food, on convex surface 26B of blade 27, inside a cooking pan (not shown). It is within the scope of this invention for elongated shaft 2 to have handle 3 located opposite neck portion 4. Bowl 5 is connected to neck portion 4 of shaft 2. Bowl 5 has concave portion 6 (FIG. 6) located opposite blade 27 having radiused and/or convex surface 26B. Bowl 5 has bore 9 traversing bowl 5. Bore 9 of bowl 5 has first opening 10 (FIG. 6) located opposite second opening 11. First opening 10 (FIG. 6) of bore 9 is located on concave portion 6 (FIG. 6) of bowl 5. Second opening 11 of bore 9 is located adjacent to blade 27 of bowl 5. Neck portion 4 of shaft 2 is connected to bowl 5.

In an embodiment, bore 9 of bowl 5 of multifunctional cooking device 1 receives chopped food (not shown) when a user (not shown) exerts a downward and front and/or backward and/or side-to-side force on multifunctional cooking device 1 when food (not shown) is being chopped in cooking pan (not shown), whereby, food (not shown) traverses bore 9 of bowl 5.

Figure 7:
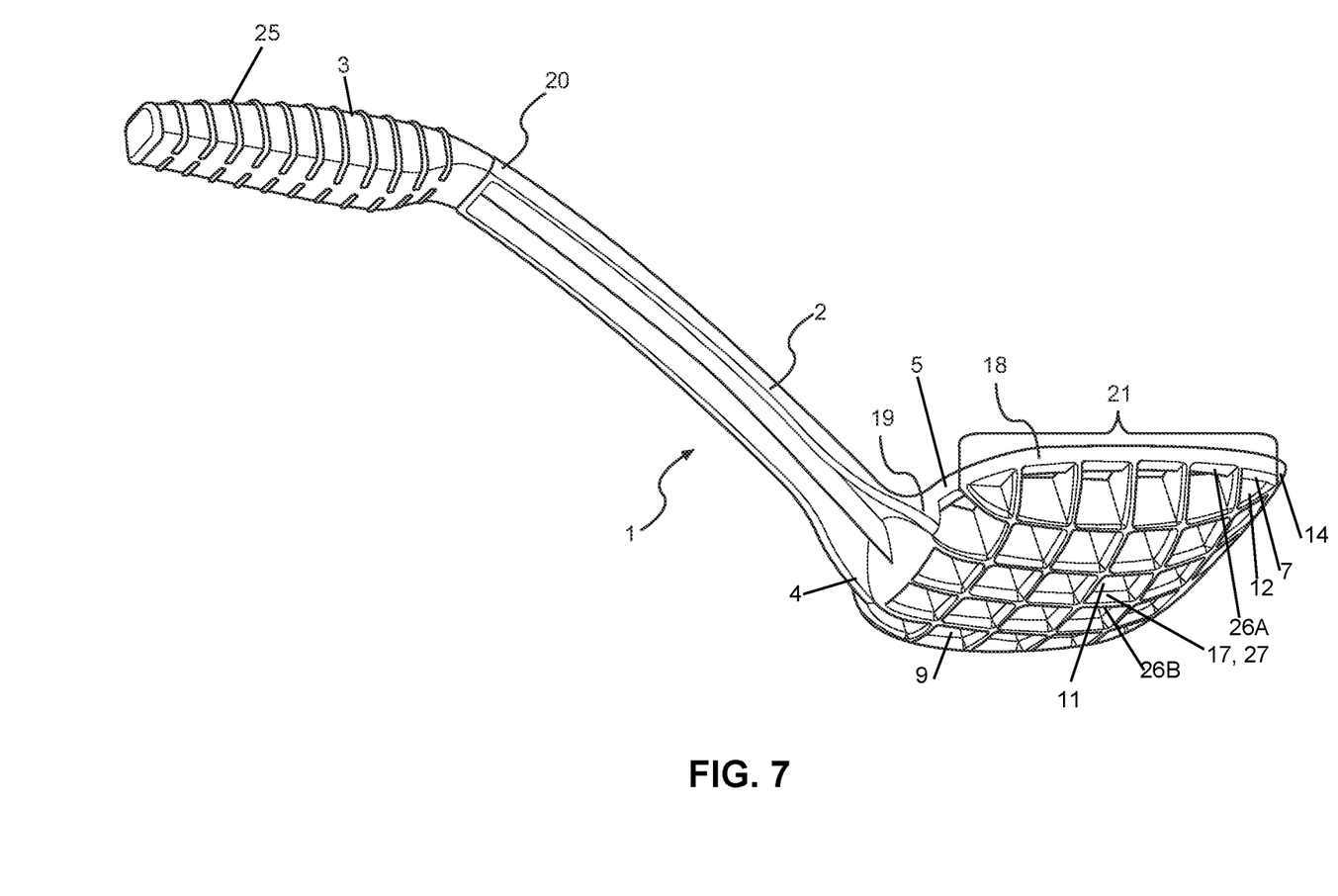
FIG. 7 is a rear perspective view of the novel multifunctional cooking device in accordance with an illustrative embodiment.

FIGS. 5 and 7 show multifunctional cooking device 1 having elongated handle member 2 having opposite proximal 19 and distal ends 20. Non-planar support member 18, which is the same structure as bowl 5, being extended from proximal end 19 of handle member 2, which is the same structure as shaft 2. Support member 18 has outer perimeter edge 15 formed from first support structure 23 located opposite second support structure 24. Support member 18 having concave portion 6 (FIG. 1) located opposite back portion 7. Back portion 7 has convex surface 26A. Flange 14 extending from at least a portion of outer perimeter edge 15 of support member 18. At least one side wall surface 12 extending from back portion 7 of support member 18.

Referring again to FIG. 5, at least one side wall surface 12 having tapered edge 17 forming first blade 21. First blade 21 traversing the length of support member 18 from anchor point 31A at proximal end 19 of handle member 2 to flange 14. At least one side wall 12 having tapered edge 17 forming second blade 22. Second blade 22 traversing the length of support member 18 from anchor point 31C at first support structure 23 to anchor point 31B at second support structure 24. Proximal end 19 of handle member 2 is connected to support member 18. Flange 14 is tapered 16. First blade 21 is oriented substantially perpendicular to flange 14, whereby, angle 28 depicts right angle. Second blade 22 is oriented substantially perpendicular to first support structure 23 and to second support structure 24. Distal end 20 of handle member 2 has at least one opening (not shown).

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the description is intended to cover all of the generic and specific features of the invention herein described, and all statements of the scope of the invention that, as a matter of language, might be said to fall therebetween.

Now that the invention has been described,

The invention claimed is:

1. A multifunctional cooking device, comprising:
   a shaft, the shaft having a handle located opposite a neck portion;
   a bowl comprising:
      a left side;
      a right side;
      a front side; and
      a rear side;
   the bowl connected to the neck portion of the shaft, the bowl having a concave portion located opposite a back portion, the back portion having a convex surface;
   the bowl having a plurality of bores traversing the bowl, the plurality of bores each having a first opening located opposite a second opening, the first opening of the plurality of bores being located on the concave portion of the bowl, the second opening of the plurality of bores being located on the back portion of the bowl extending to the first opening;
   a plurality of side walls extending from the left side to the right side and the rear side to the front side of the bowl to define the plurality of bores, and the plurality of bores defining chambers; and
   a flange, the flange extending from at least a portion of an outer perimeter edge of the bowl;
   wherein the flange is tapered, and is located on the front side of the bowl;
   wherein, an end of at least one side wall has a tapered edge forming a blade having a convex surface traversing a length of the bowl from the connection point to the flange; and
   wherein the side walls have varying width from the outer perimeter edge of the bowl through a centerline of the bowl.

2. The multifunctional cooking device of claim 1, further comprising:
   the neck portion of the shaft is connected to the bowl at an angle of inclination of at least 45°.

3. The multifunctional cooking device of claim 1, wherein the blade has a serrated edge.

4. The multifunctional cooking device of claim 1, wherein the chambers are configured to receive chopped food when a user exerts a downward and forward and/or backward and/or side-to-side force on the multifunctional cooking device when food is being chopped in a cooking pan.

5. The multifunctional cooking device of claim 1, wherein the side walls extending from the back portion of the bowl are oriented perpendicular to the flange.

* * * * *